Figure 1:
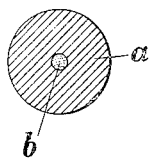

R. TRUNK.
WIRE FOR MAKING CHAINS AND OTHER ARTICLES OF JEWELRY.
APPLICATION FILED DEC. 13, 1916.

1,336,449. Patented Apr. 13, 1920.

INVENTOR:
RUDOLF TRUNK
BY:
ATTORNEY

UNITED STATES PATENT OFFICE.

RUDOLF TRUNK, OF PFORZHEIM, GERMANY, ASSIGNOR TO THE FIRM OF FR. KAMMERER, OF PFORZHEIM, BADEN, GERMANY.

WIRE FOR MAKING CHAINS AND OTHER ARTICLES OF JEWELRY.

1,336,449.      Specification of Letters Patent.      Patented Apr. 13, 1920.

Application filed December 13, 1916. Serial No. 136,785.

*To all whom it may concern:*

Be it known that I, RUDOLF TRUNK, workmaster, a subject of the Grand Duke of Baden, German Empire, residing at No. 22 Grenzstrasse, Pforzheim, Germany, have invented new and useful Improvements in Wire for Making Chains and other Articles of Jewelry; and I do hereby declare the following to be a full, clear, and exact description of the same.

My invention relates to the production of wire of any desired shape out of any suitable metals, particularly precious metals, such as gold or silver. This wire possesses hollow spaces, which preferably extend throughout its entire length and are filled with substances required for soldering, for example, soft solder, but specially such substances as would prevent oxidation. A large number of substances of this kind are known. The most suitable is borax and therefore in the following specification I shall only speak of this substance, without however intending to restrict myself to the same.

The wire made according to my invention has preferably the form of a hollow tube. This tube is filled inside with the substances mentioned, which are useful in soldering, thus for example, metals or metal mixtures having a low melting point, and, further, with substances, which prevent oxidation in soldering or dissolve the oxid formed, such as borax. I provide thus in the inside of the cylindrical tube, called hollow wire, such a substance suitable for preventing oxidation either alone or in combination with metallic solder.

Hollow wire of this kind I make in any desired length, and, as mentioned above, any metal may be used having a higher melting point than the solder or flux provided in the interior of the wire. Such metals are principally the precious metals, copper, bronze, brass, etc. If chains or other articles of jewelry are to be made from this wire, definite lengths of wire are cut off and brought into the desired circular or other form, for example, into the shape of chain links, whereupon the article is heated, so that the solder and flux are melted.

I am aware that wire containing a filling suitable for soldering, that is, a filling of some easily melting metallic solder is already known. This existing hollow wire has a tubular shape, with a hollow space extending throughout its entire length, and the interior is filled with an easily melting metal, which is designed to serve as solder. From such wire definite lengths are also cut, brought into the form of chain-links, twists, or any other forms, and then heated, so that the solder is melted. The solder flows out at the joint, and closes the abutting edges of the metal mantle forming the link or other body.

It is however known that the work with such "solder wire" is very slow and difficult, and the manufacture of soldered chains, for example, with such wire, although it is somewhat simplified, must still be regarded as very tedious.

For carrying out the soldering process some preparatory measures are necessary in this case. The closing of the joint formed by the abutting edges only takes place properly when a flux, for example, borax is applied to the outside of the point being soldered. For this purpose the chains were heretofore boiled in a borax bath. After this boiling the chains must be broken and polished, in order to remove the superfluous borax. This is necessary, because, as is well known, the solder runs to every part covered by the borax. The chains thus treated must then be covered with a solder repelling substance or be continuously shaken or broken during the soldering process. If this is not done the separate links are rigidly connected together by the issuing solder when it solidifies. This must of course be prevented under all circumstances, because every link of the chain must be movable independent of the others.

Even when all these precautions are taken it still very often occurs, when the existing "solder wire" is used, that the links of the chain are soldered together. This is due to the fact that at one or the other point some borax remains. Further, it often occurs that in some links the joints are too open or too tightly closed. In the first case the borax is removed from the joints in breaking and polishing the chain, while in the second case no borax penetrates into the joints. In both cases the joints are not properly soldered.

By using my invention all these disadvantages are overcome. On heating my new hollow wire, from which, for example, chain links have been made and connected together to form a chain, the borax passes out of the hollow space or spaces in the wire into the joints, so that the soldering process is certain to be successful.

In making the wire I take care that only as much borax is used as is necessary for soldering. If this precaution is taken no stiffening of the rings can take place, because no borax can penetrate to the parts where no soldering is to take place.

When I have made my new hollow wire in such a manner that in the hollow space or spaces the metallic solder and at the same time the flux, such as borax, are contained, which is done, for example, by mixing the metal and flux in powdered form in the proper proportions and by filling the wire with this powder, or by forming the wire out of a piece of metal while simultaneously using the said mixture, it is immaterial for the soldering process whether a joint is open too far or too little, because under all circumstances flux and solder in proper proportions penetrate into the joints.

For the purpose of better explaining my invention I have shown on the accompanying drawing several sections of "solder wire" made in accordance with my invention.

Similar reference letters designate similar parts throughout the several views.

Figure 2:
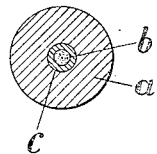
Figure 3:
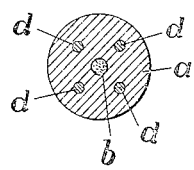

In the drawing, Figure 1 shows a wire having flux in a space thereof; Fig. 2 shows a wire having a tube therein, and with flux in said tube; Fig. 3 shows a wire having separate spaces for flux and for solder.

Fig. 1 shows in cross section a metal wire $a$ which has tubular interior extending throughout the entire wire. In this hollow a mixture of metallic solder and flux, for example in powder or paste form, is provided. The thickness of the wire $a$ and the diameter of the interior containing the flux $b$ can be varied according to desire.

Fig. 2 also shows a cross section of a "solder wire" made in accordance with my invention.

The metal wire $a$ has also a hollow axial space, which here however has a much larger diameter than in the construction shown in Fig. 1. In the interior there is a second tube $c$ which consists of solder, and in the interior of this second tube the flux, for example borax, is contained in powderform.

A variety of combinations may be adopted in carrying out my invention, and the dimensions of the parts of the metal wire $a$, or of the filling $b$, or of the solder $c$, are of no moment, although the examples shown in Figs. 1 and 2 produce quite especially good results.

A further construction of my new "solder wire" is shown in cross section in Fig. 3. In this construction there is a flux filling $b$ in the form of a wire extending throughout the entire length of the wire and concentric thereto, and also parallel to the axis of the solder wire $a$, there are four threads of solder $d$, which also extend through the whole wire.

If such a wire is heated, after a chain link, or other article has been made therefrom, the heat will melt the flux $b$ and solder $d$. At the joint the flux and solder will meet together in molten condition, so that there is every reason for the soldering being properly effected.

What I claim and desire to secure by Letters Patent of the United States is:—

1. A metallic body, in combination with solder and flux housed therein.

2. A hollow metallic body having a plurality of hollow portions, in combination with solder carried in one hollow thereof and with flux carried in another hollow thereof.

3. A metallic wire, in combination with solder and with flux housed therein.

4. A metallic wire, in combination with a thread of solder therein and with a thread of flux therein.

Signed at Mannheim, Germany, this 26th day of September, 1916.

RUDOLF TRUNK.

Witnesses:
FR. KAMMERER,
RUTH P. MANN.